(12) United States Patent
Burger et al.

(10) Patent No.: US 6,479,918 B1
(45) Date of Patent: Nov. 12, 2002

(54) DRILLING IMPLEMENT

(75) Inventors: Helmut Burger, Moorenweis (DE); Lutz Troeder, Türkenfeld (DE); Ernst-Rudolf Lübkert, Landsberg (DE); Georg Brami, Lansberg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/696,373

(22) Filed: Oct. 25, 2000

(30) Foreign Application Priority Data

Oct. 29, 1999 (DE) .......................................... 199 52 332

(51) Int. Cl.⁷ .......................... H02K 23/18; H02K 23/66
(52) U.S. Cl. .......................... 310/241; 310/239; 310/50
(58) Field of Search ....................... 310/50, 241, 239; H02K 7/14, 13/00; H01R 39/44

(56) References Cited

U.S. PATENT DOCUMENTS 3,440,465 A * 4/1969 Pratt et al. ................... 310/230

FOREIGN PATENT DOCUMENTS

EP  4215905  8/1989  .......... H02K/23/18

* cited by examiner

Primary Examiner—Karl Tamai
(74) Attorney, Agent, or Firm—Sidley Austin Brown & Wood, LLP

(57) ABSTRACT

The hand-held drilling and/or screwing implement has a housing with a handle, an electrical driving motor, a carbon brush holder ring and a switching body, which interacts rotationally locked with the carbon brush holder ring. At the carbon brush holder ring, two carbon brush holders are disposed opposite to one another and the switching body has an actuating element, which is disposed on the side opposite to the handle. With the help of an axial positive connection, the carbon brush holder ring can be fastened to the stator, so that it can be inserted together with the stator as a unit in the housing.

6 Claims, 5 Drawing Sheets

DRILLING IMPLEMENT

FIELD OF INVENTION

The invention relates to a novel economic easy and quick assembly of a hand-held drilling or screwing implement, with a housing, a handle protruding perpendicularly from the housing, an electrical driving motor, a carbon brush holder ring disposed co-axially to the driving motor and a switching body, interacting with the carbon brush holder ring.

BACKGROUND INFORMATION AND PRIOR ART

U.S. Pat. No. 3,440,465 discloses a hand-held electrical tool, for which the direction of rotation of the driving motor can be reversed. This electrical tool has a housing and a handle protruding perpendicularly from the housing. An actuating element of a switching body, disposed in the housing, is freely accessible, over an opening in the housing opposite to the handle. The actuating element can be shifted to a limited extent in the circumferential direction of the driving motor, for example, from a clockwise running position into a counter-clockwise running position. This switching body is connected in a rotationally locking manner with a carbon brush holding ring, which is disposed coaxially with the driving motor and at which there are two carbon brush holders, which are diametrically opposite one another and have, in each case, one carbon brush. These carbon brush holders are disposed along an axis extending essentially parallel to the longitudinal extent of the handle.

The carbon brush holding ring is disposed between two components, which are bolted together and can be rotated to a limited extent in the circumferential direction. In the region of the carbon brush holder ring, a portion of the housing is formed by a removable cap, which covers the switching body and the carbon brush holder ring. In the interior of the cap, there is a further part of the housing, which is provided with an accommodating borehole. One of the two components, between which the carbon brush holder ring is disposed, is connected firmly with the further part of the housing with the help of a bolted connection. A portion of the accommodating borehole, facing the commutator of the driving motor, serves to accommodate a bearing, which is disposed in the free end region of the motor shaft of the driving motor on the commutator side. The part of the accommodating borehole, averted from the commutator, has a smaller diameter and serves to accommodate and form a bearing for the switching body.

The assembly of this known, hand-held electrical tool is composed of a large number of steps. To begin with, the stator is incorporated in the housing. Subsequently, the carbon brush holder ring and the components interacting therewith are fastened to the further part of the housing. Subsequently, the rotor of the driving motor is pushed through an opening of the housing on the side, seating the tool, into the stator and the switching body is slipped onto the further part of the housing. Finally, the opening of the housing on the side, on which the tool is seated, is closed and the cap is placed on the remaining part of the housing. Because of the large number of steps, which require much time, an economic production is not possible.

OBJECT OF THE INVENTION

It is an object of the invention to provide an economic drilling or screwing implement, which can be constructed easily and assembled quickly.

SUMMARY OF THE INVENTION

This objective is accomplished by a drilling and/or screwing implement, with a housing, a handle protruding essentially perpendicularly from the housing, an electrical driving motor, a carbon brush holder ring disposed coaxially to the driving motor and rotatable in a circumferential direction, and a switching body, interacting rotationally locked with the carbon brush holder ring, the carbon brush holder ring having two carbon brush holders disposed along an axis extending essentially parallel to the longitudinal extent of the handle and lying opposite one another, and the switching body having an actuating element on one side opposite to the handle, wherein the carbon brush holder ring is connectable axially positively with the stator.

Because of the inventive axial, positive fixing of the carbon brush holder ring at the stator, it is possible to assemble these two parts as a sub-assembly, before they are inserted in the housing; the sub-assembly can then be inserted quickly and easily in only one step in the housing.

So that the carbon brush holder ring can be fixed to the stator, the carbon brush holder ring has at least two stop surfaces, which point away from the stator and interact with at least two counter-surfaces of the stator. The stop surfaces, as well as the counter-surfaces extend in a direction essentially perpendicularly to the longitudinal axis of the driving motor.

A limited ability to rotate the carbon brush holder ring relative to the stator is achieved by advantageously having each stop surface at a projection of the carbon brush holder ring protruding in the direction of the stator. Each of the two projections protrudes, for example, in a guiding region of the stator, which is in an end region of the stator facing the carbon brush holder ring. Each guiding region extends over a portion of the periphery of the stator and is limited in both directions by a stop, at which the projections come into contact, depending on the position of the carbon brush holder.

So that the carbon brush holder ring can be mounted quickly at the stator, without having to resort to any additional installation tools, the projection preferably is constructed so that it can be bent in the radial direction.

Advantageously, a section, between the stop surface and the free end of the projection, tapers towards the free end of the projection. By these means, when the stator and the carbon brush holder ring are connected axially, an automatic bending apart of the two projections is achieved as soon as the tapering section of the projections comes into contact with a corresponding outer contour of the stator. When the end position of the carbon brush holder ring is reached, the stop surfaces of the projections can latch behind the counter-surfaces of the stator in that the outwardly bent projections can swing back once again into their normal position.

In order to be able to achieve as slender a construction of the drilling and screwing implement as possible in a direction, perpendicularly to the longitudinal extent of the handle and perpendicularly to the longitudinal extent of the driving motor, each projection advisably is disposed in the region of a carbon brush holder.

So that, on the one hand, the two connecting regions between the stator and the carbon brush holder can be reached easily and, on the other, the carbon brush holder ring can be rotated to a limited extent in the circumferential direction with respect to the stator, the counter-surface preferably is disposed in the circumferential region of the stator and extends over a portion of the periphery of the stator.

In order to be able to exclude a possible clearance between the stop surfaces of the carbon brush holder ring and of the counter-surfaces of the state, at least two springs, which force the stop surfaces against the counter-surfaces, are advantageously disposed between the carbon brush holder ring and the stator. The springs are, for example, compression springs, which ensure that the stator and the carbon brush holder ring are pressed apart, so that the stop surfaces and the counter-surfaces lie in contact with one another and the carbon brush holder ring is held in the appropriate position for clockwise or counter-clockwise rotation.

With the help of the axial, positive connection, the carbon brush holder ring is fixed only axially with respect to the stator. The radial support and the rotatable mounting of the carbon brush holder ring are accomplished preferably by a bearing at the inner wall of the housing, interacting with the outer contour of the carbon brush holder ring.

The preferred embodiments of the invention are described herein with reference to the accompanying drawings, in which:

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

DESCRIPTION OF THE PREFERRED EMBODIMENTS

Figure 1:
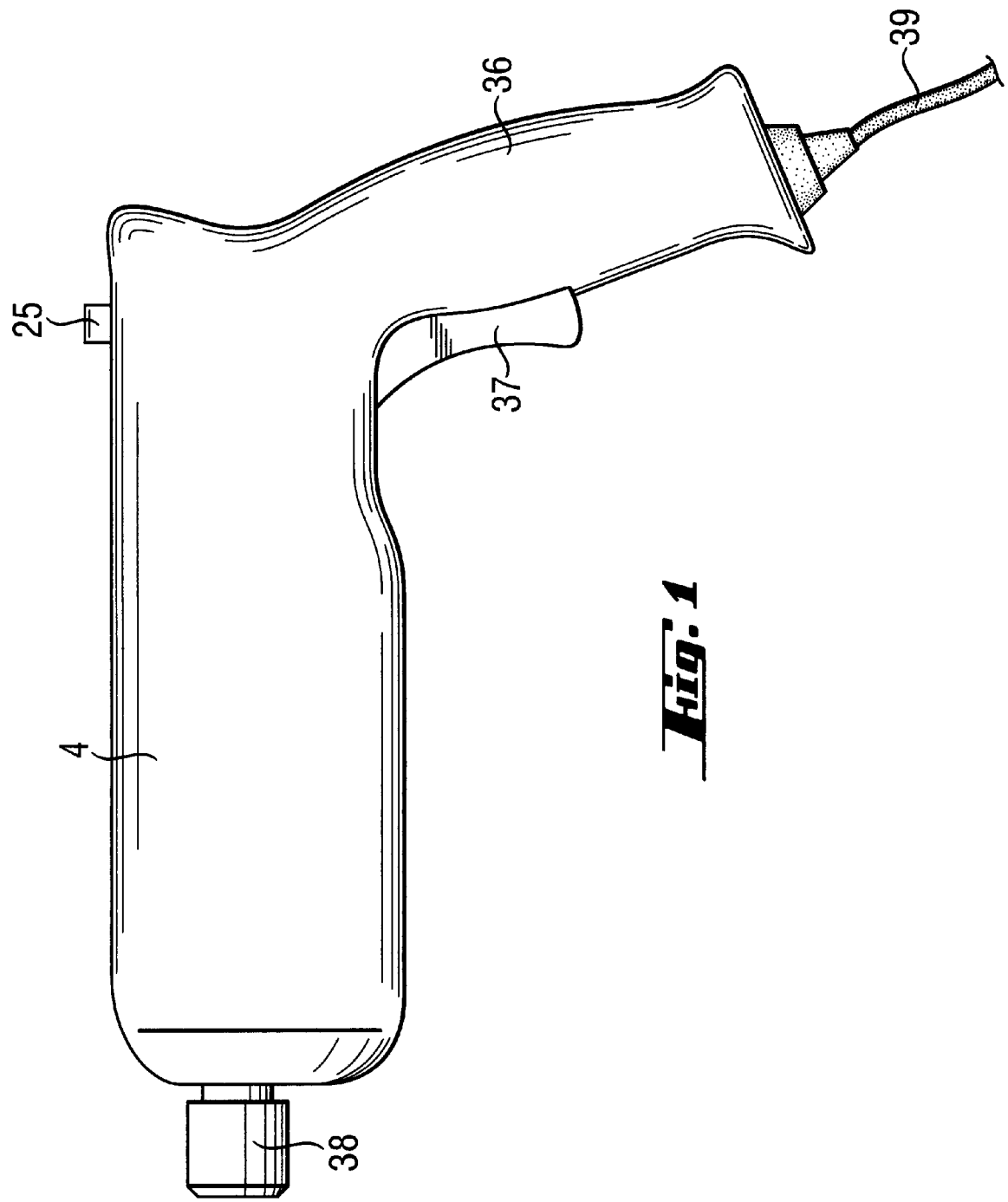
FIG. 1 shows a side view of the inventive drilling or screwing implement.
Figure 2:
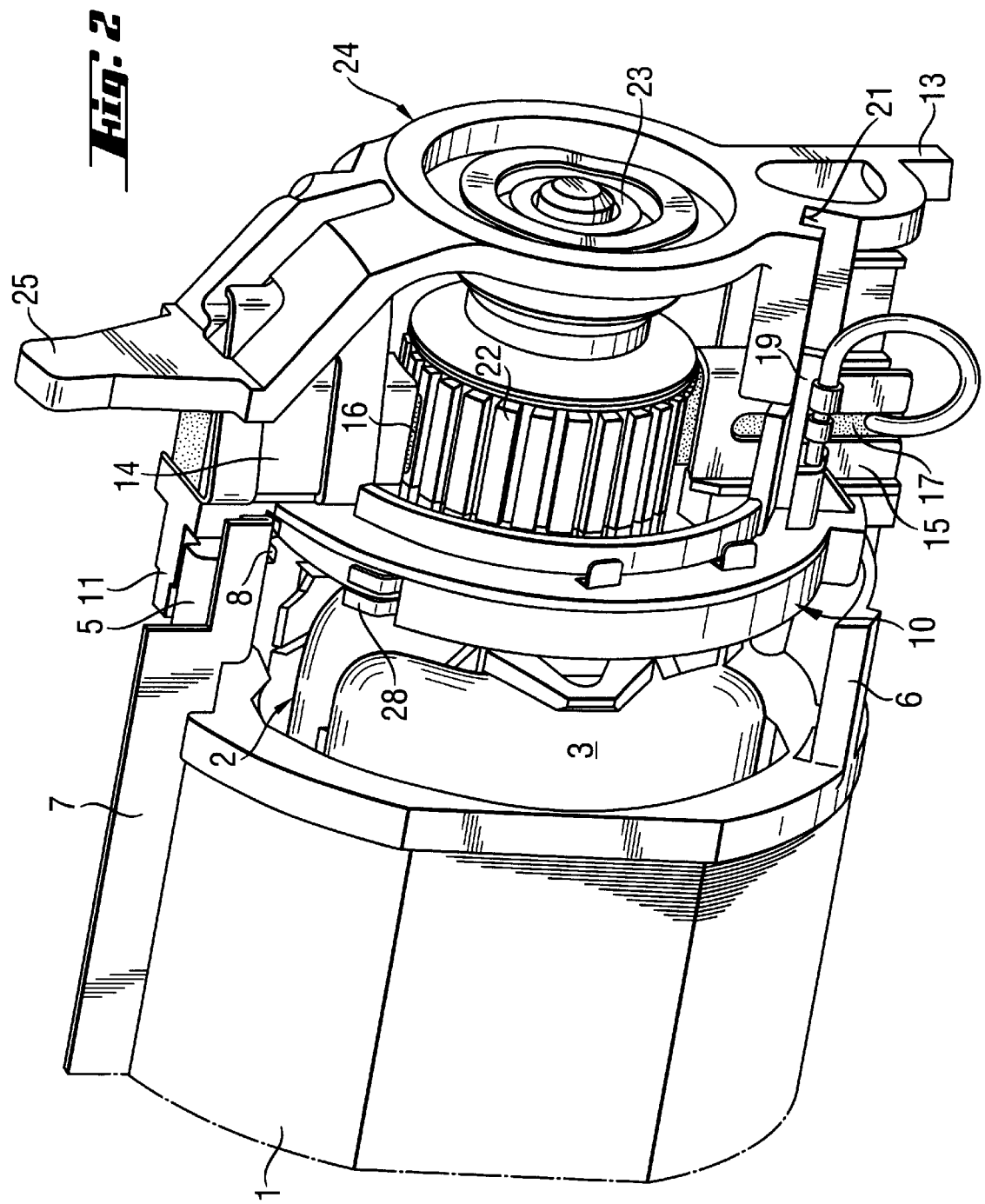
FIG. 2 shows a region on the commutator side of the inventive drilling or screwing implement, without the housing and without the tension springs, which interact with the carbon brushes.
Figure 3:
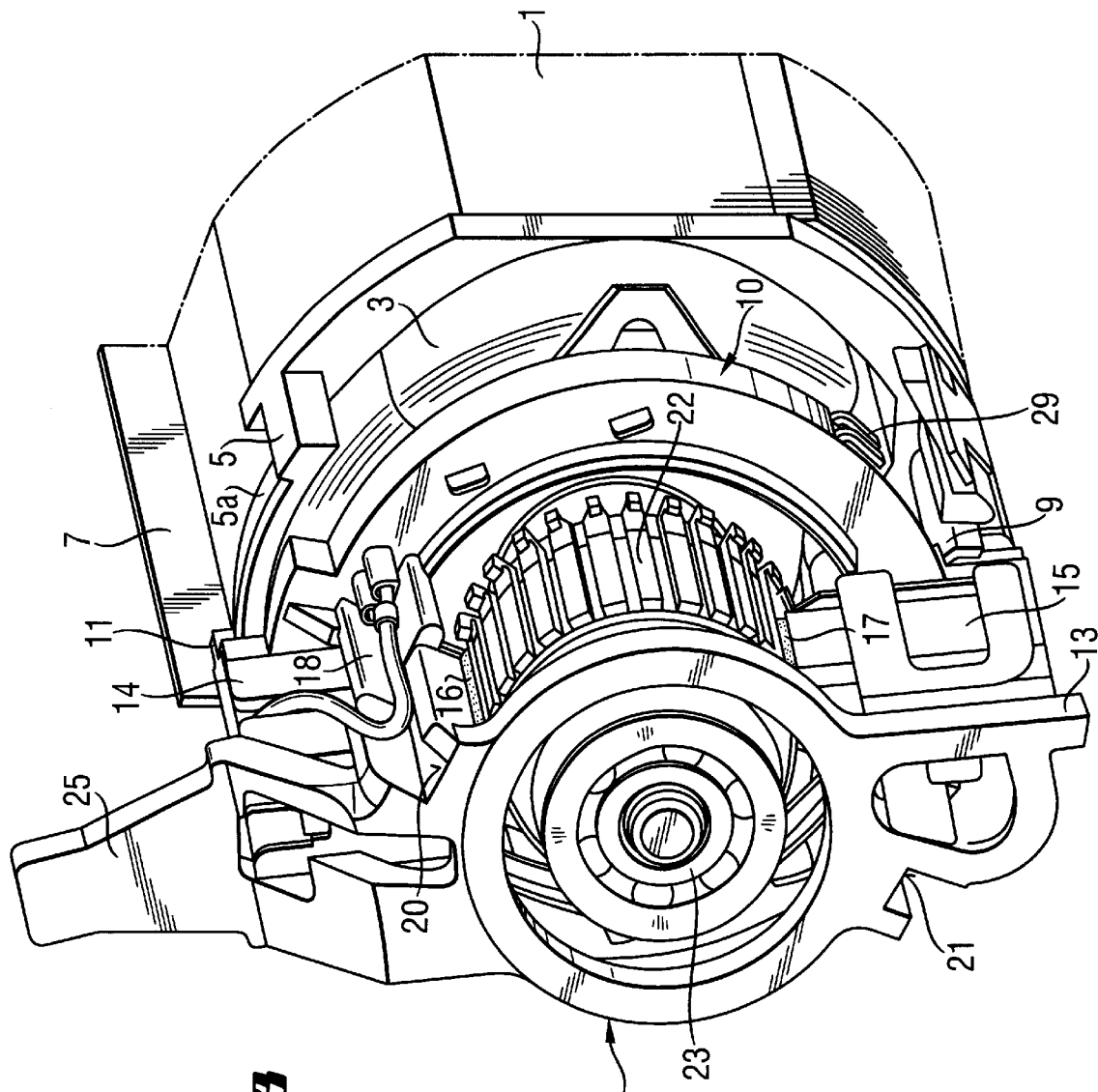
FIG. 3 shows a further view of the region on the commutator side, without the housing and without tension springs.
Figure 4:
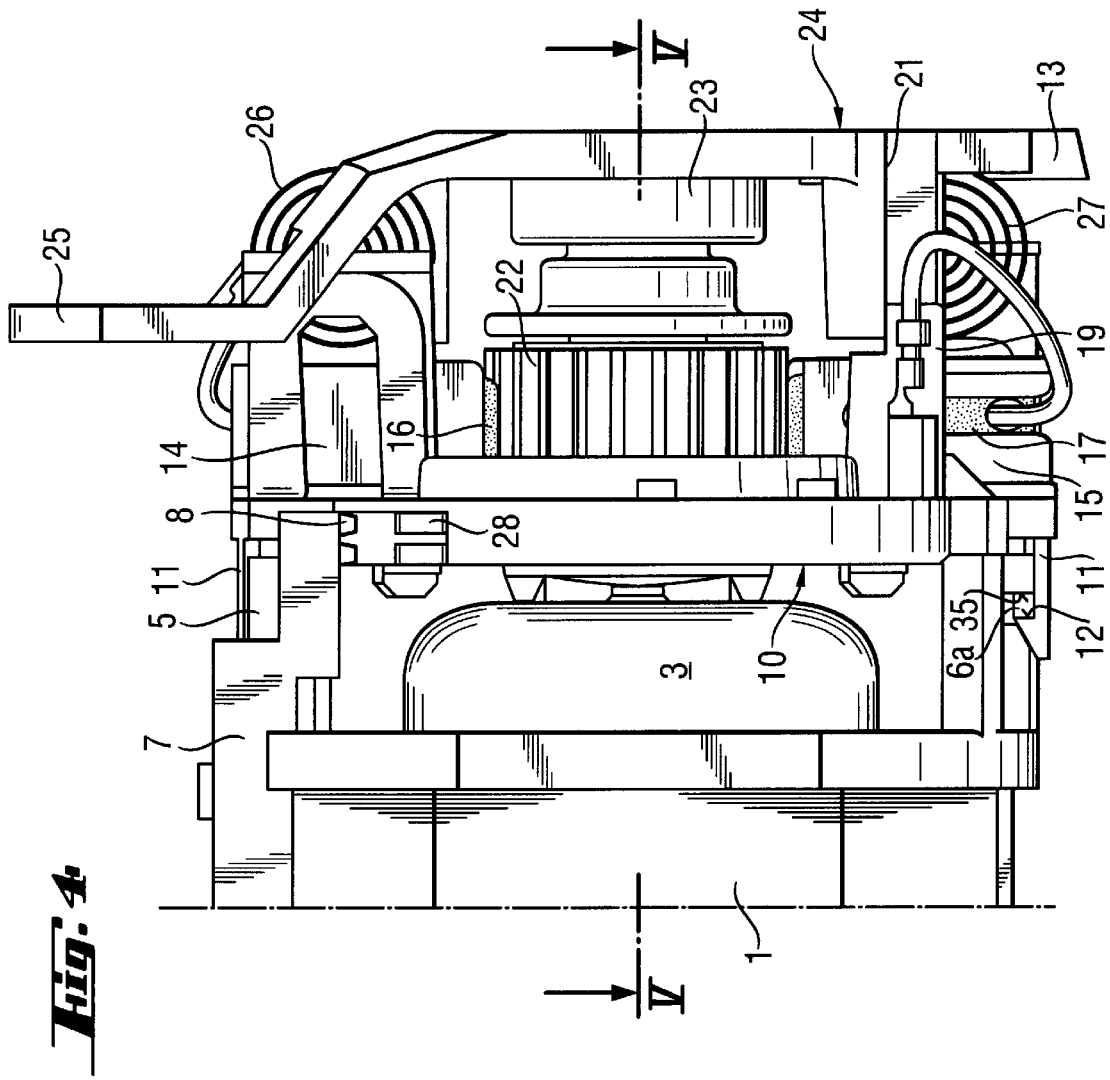
FIG. 4 shows a side view of the region of FIG. 2 without the housing and FIG. 5 shows a section through the drilling or screwing implement of FIG. 4 along a central longitudinal axis of a driving motor.
Figure 5:
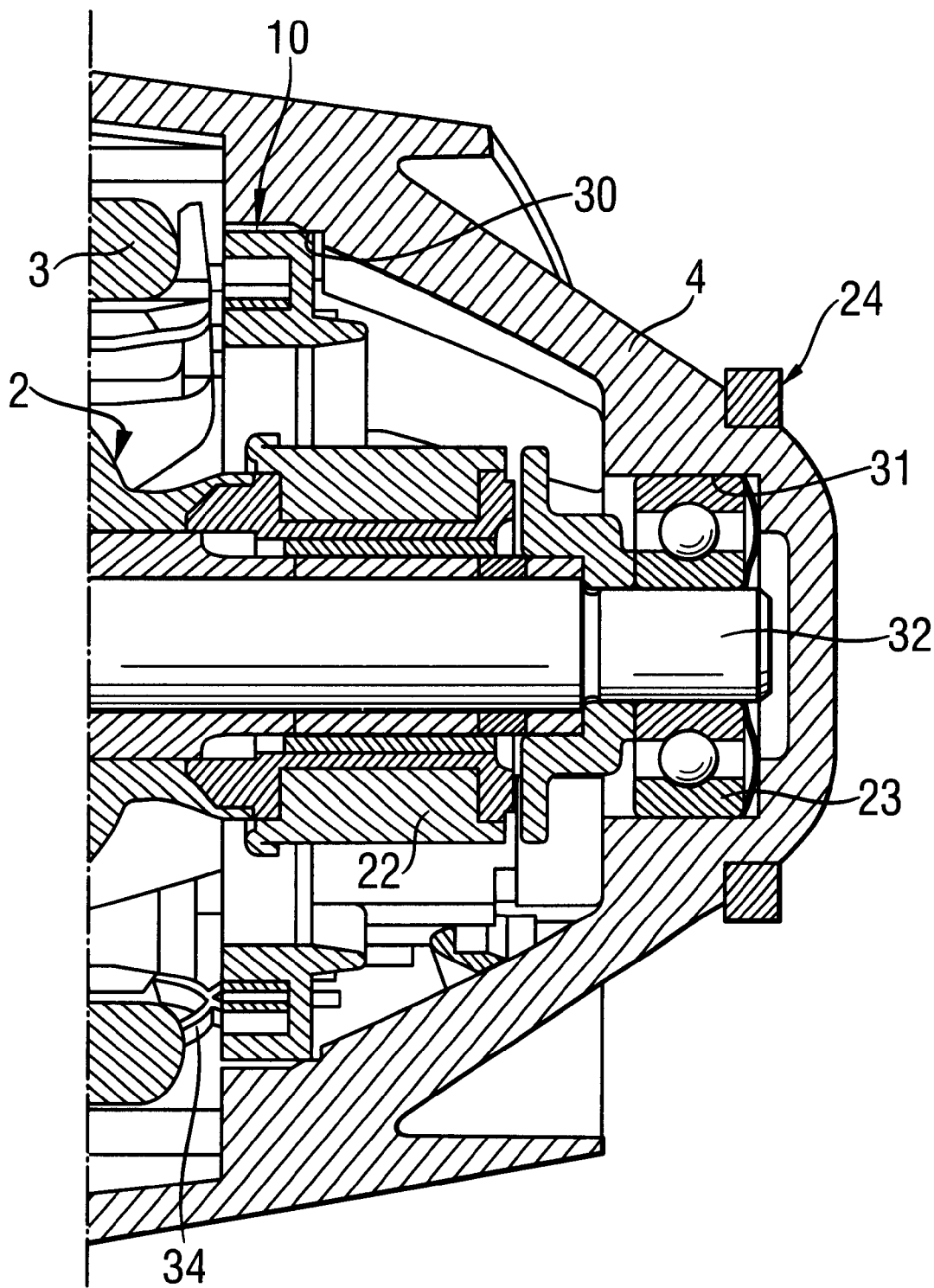

As shown by FIG. 1, the inventive drilling or screwing implement has a housing 4, a handle 36, an actuating switch 37 and a tool seat 38 in a first free end region of the housing 4, into which the drilling or screwing implement, which is not shown, can be inserted. The handle 36 is at a second end region lying opposite the first free end region and protrudes essentially perpendicularly from the housing 4. The actuating switch 37 is disposed in a region of the handle 36, facing the tool seat 38. The drilling or screwing implement can be connected with an external power supply by an electrical connection 39, which protrudes from the free end of the handle 36. On a side of the housing 4, opposite to the handle 36, an actuating element 24 protrudes (shown in FIG. 2), with the help of which the direction of rotation of the tool seat 38 can be reversed.

As can be seen from FIGS. 2 to 5, the interior of the housing 4 contains a driving motor, a carbon brush holder ring 10, which adjoins the driving motor, and a switching body 24, which is rotationally connected with the carbon brush holder ring 10.

The driving motor has a stator 1 with a winding 3, a rotor 2 and a commutator 22, which is on the rotor shaft 32 of the driving motor. At the free end of this rotor shaft 32, a bearing 23 is mounted, over which the rotor shaft 32 is supported in an appropriate accommodating borehole of the housing 4, which is not shown. At an end region, facing the carbon brush holder ring 10, the housing 4 has two protruding, partially circular guiding regions 5, 6, which lie essentially diametrically opposite to one another and the free ends of which, in relation to the circumferential direction of the stator 1, are provided in each case with a stop. Each of these guiding regions 5, 6 has on the outside a depression 5a, 6a, which extends between the two stops. These depressions 5a, 6a form a counter-surface 35, which is averted from the carbon brush holder ring 10.

The counter-surfaces 35 are gripped from behind by two projections 11 of the carbon brush holder 10, which in each case have a stop surface 12, which interacts with the counter-surfaces 35. Between the stop surface 12 and the free end of the projection 11, each projection 11 has a section, which tapers towards the free end and towards the radial outer contour of the projection 11.

In the region of each projection 11, the carbon brush holder ring 10 is provided with a carbon brush holder 14, 15 which, on a side opposite the projection 11 of the carbon brush holder ring 10, protrudes from the latter and is disposed over the commutator 22 of the driving motor. Within the carbon brush holder 14, 15, there is a carbon brush 16, 17, which is pressed with a spring 26, 27, which is shown only in FIG. 4, against the outer contour of the commutator 22. The two carbon brush holders 14, 15 are disposed along an axis extending essentially parallel to the longitudinal extent of the handle 36. In this way, it is possible to construct the drilling or screwing implement so that it is slender in a direction extending perpendicularly to the longitudinal extent of the handle 36.

At a side, facing the driving motor, the carbon brush holder ring 10 has depressions, in which two contact springs 28, 29, which are separated from one another and extend over a portion of the circumferential region of the carbon brush holder ring 10, are accommodated. Both contact springs 28, 29 have an electrical tag, which passes through the carbon brush holder ring 10 in a direction averted in from the driving motor and protrudes somewhat from the carbon brush holder ring 10. On each of these two tags, there is an electrical connector, which is connected with a carbon brush 16, 17 that interacts with the commutator 22.

The contact springs 28, 29 are provided at their end regions with contacts, which can be connected electrically with the winding 3 of the driving motor over counter-contacts 8, 9 connected over current bars 7. In the drawings, only one current bar is shown.

In region of the two tags, two catches 19, 18, which protrude in a rotationally locking manner into two recesses 20, 21 of the switching body 24, protrude from the carbon brush holder ring 10 in a direction averted from the driving mentor. These recesses 20, 21 are disposed at the outer contour of two catches, protruding from the switching body 24 in the direction of the driving mentor. The switching body 24 is provided with a borehole, the internal diameter of which is larger than the external diameter of the bearing disposed on the rotor shaft 32.

In the region on the commutator side, the housing 4 of the inventive drilling or screwing implement is constructed pot-shaped. This pot-shaped region is provided with a few cutouts, in order to ensure accessibility, particularly to the carbon brushes 16, 17. At the outer contour, there is a bearing for the switching body 24, the borehole of which is matched to the diameter.

In the region of a first carbon brush holder 14, an actuating element 25, which passes through the housing 4 through an appropriate opening on the side opposite the handle 36, protrudes from the switching body. With the help of the actuating element 25, the carbon brush holder ring 10 can be rotated to a limited extent in the circumferential direction, in order to change the contacting between the contacts of the contact springs 28, 29 and the counter-contacts 8, 9, which are connected to the winding.

In the region of the second carbon brush holder 15, the switching body 24 is provided with a locking catch 13, which protrudes in the direction of the handle 36 and, during the rotation of the carbon brush holder ring 10, is swiveled into the working region of the actuating switch 37, so that the latter cannot be actuated or depressed.

What is claimed as new and desired to be protected by letters patent is set forth in the appended claims

What is claimed is:

1. A hand-held drilling or screwing implement with a housing, a handle protruding essentially perpendicularly from the housing, an electrical driving motor, a carbon brush holder ring disposed coaxially to the driving motor and rotatable in a circumferential direction, and a switching body, interacting rotationally locked with the carbon brush holder ring, the carbon brush holder ring having two carbon brush holders disposed along an axis extending essentially parallel to the longitudinal extent of the handle and lying opposite one another, and the switching body having an actuating element on one side opposite to the handle, wherein the carbon brush holder ring is connectable axially positively with the stator, wherein the carbon brush holder ring has two stop surfaces interacting with at least two counter-surfaces of the stator, wherein each stop surface is at a projection of the carbon brush holder ring, protruding in the direction of the stator and wherein the projection is flexible in the radial direction.

2. The drilling or screwing implement of claim 1, wherein a section between the stop surface and the free end of the projection tapers towards the free end of the projection.

3. The drilling or screwing implement of claim 2, wherein each projection is disposed in the region of a carbon brush holder.

4. The drilling or screwing implement of claim 1, wherein the counter-surface is disposed in the peripheral region of the stator and extends over a portion of the periphery of the stator.

5. The drilling or screwing implement of claim 1, wherein at least two springs, which press the stop surfaces against the counter-surfaces, are disposed between the carbon brush holder ring and the stator.

6. The drilling or screwing implement of claim 1, wherein the carbon brush holder ring is mounted rotatably at the inner wall of the housing over a bearing, interacting with the outer contour of the carbon brush holder ring.

* * * * *